United States Patent
Sakurai et al.

(10) Patent No.: US 10,963,473 B2
(45) Date of Patent: Mar. 30, 2021

(54) PATTERN FINDING DEVICE AND PROGRAM

(71) Applicants: KABUSHIKI KAISHA TOSHIBA, Minato-ku (JP); TOSHIBA SOLUTIONS CORPORATION, Kawasaki (JP)

(72) Inventors: Shigeaki Sakurai, Yokohama (JP); Minoru Nishizawa, Itabashi (JP)

(73) Assignees: KABUSHIKI KAISHA TOSHIBA, Minato-ku (JP); TOSHIBA SOLUTIONS CORPORATION, Kawasaki (JP)

( * ) Notice: Subject to any disclaimer, the term of this patent is extended or adjusted under 35 U.S.C. 154(b) by 136 days.

(21) Appl. No.: 15/124,188

(22) PCT Filed: Mar. 30, 2015

(86) PCT No.: PCT/JP2015/059882
§ 371 (c)(1),
(2) Date: Sep. 7, 2016

(87) PCT Pub. No.: WO2015/152141
PCT Pub. Date: Oct. 8, 2015

(65) Prior Publication Data
US 2017/0017697 A1    Jan. 19, 2017

(30) Foreign Application Priority Data
Mar. 31, 2014    (JP) .............................. JP2014-073683

(51) Int. Cl.
*G06F 16/2458*    (2019.01)
*G06F 16/28*    (2019.01)
*G06N 20/00*    (2019.01)

(52) U.S. Cl.
CPC ........ *G06F 16/2465* (2019.01); *G06F 16/285* (2019.01); *G06N 20/00* (2019.01)

(58) Field of Classification Search
CPC .. G06F 19/24; G06F 19/707; G06F 2207/025; G06F 17/30539; G06F 16/285;
(Continued)

(56) References Cited

U.S. PATENT DOCUMENTS 6,189,005 B1 * 2/2001 Chakrabarti ...... G06F 17/30551
6,449,612 B1 * 9/2002 Bradley ............... G06K 9/6221
(Continued)

FOREIGN PATENT DOCUMENTS

JP    4953834 B2    6/2012
JP    2012-256185 A    12/2012
(Continued)

OTHER PUBLICATIONS

R. Agrawal, et al., "Mining Sequential Patterns," Proceedings of the Eleventh International Conference on Data Engineering, Mar. 1995, 13 pages.
(Continued)

*Primary Examiner* — David T. Brooks
(74) *Attorney, Agent, or Firm* — Oblon, McClelland, Maier & Neustadt, L.L.P.

(57) ABSTRACT

A pattern finding device of embodiments includes a pattern generator, a pattern storage, a pattern selector, a pattern deleter. The pattern generator generates a group of patterns from data including a plurality of items. The pattern storage stores the group of patterns generated by the pattern generator. The pattern selector selects at least one pattern to be deleted from the group of patterns with reference to an evaluated value indicating a change of an item distribution condition in the group of patterns when at least one pattern which is selected as a candidate is excluded from the group
(Continued)

of patterns stored in the pattern storage. The pattern deleter deletes the at least one pattern that is selected by the pattern selector from the pattern storage.

7 Claims, 13 Drawing Sheets

(58) Field of Classification Search
CPC ........ G06F 16/35; G06F 16/355; G06F 16/45; G06F 16/55; G06F 16/65; G06F 16/75; G06F 16/906; G06F 11/3072; G06F 3/0641; G06F 16/174; G06F 16/1744; G06F 16/1748; G06F 16/215; G06F 17/18; G06F 2101/14; G06F 16/2465; G06K 9/00; G06K 9/00496; G06K 9/036; G06K 9/346; G06N 20/00
See application file for complete search history.

(56) References Cited

U.S. PATENT DOCUMENTS

| | | | | |
|---|---|---|---|---|
| 6,473,757 | B1* | 10/2002 | Garofalakis | G06F 17/30404 |
| 7,260,263 | B1* | 8/2007 | Jafarkhani | G06K 9/6224 |
| | | | | 382/225 |
| 2003/0023593 | A1* | 1/2003 | Schmidt | G06N 5/025 |
| 2003/0236785 | A1* | 12/2003 | Shintani | G06F 16/30 |
| 2004/0019601 | A1* | 1/2004 | Gates | G06F 16/355 |
| 2006/0241900 | A1* | 10/2006 | Hu | G06F 17/18 |
| | | | | 702/179 |
| 2007/0033185 | A1* | 2/2007 | Maag | G06F 17/30286 |
| 2007/0055665 | A1* | 3/2007 | Kitahara | G06F 17/30985 |
| 2008/0126347 | A1* | 5/2008 | Mori | G06F 17/30539 |
| 2008/0243817 | A1* | 10/2008 | Chan | G06Q 30/02 |
| 2009/0240641 | A1* | 9/2009 | Hashimoto | G06N 3/08 |
| | | | | 706/20 |
| 2010/0010985 | A1* | 1/2010 | Wong | G06F 16/2465 |
| | | | | 707/E17.014 |
| 2010/0223265 | A1* | 9/2010 | Fogel | G06K 9/6223 |
| | | | | 707/740 |
| 2013/0007003 | A1* | 1/2013 | Shyr | G06F 16/2228 |
| | | | | 707/741 |
| 2014/0112549 | A1 | 4/2014 | Sakurai et al. | |
| 2014/0330843 | A1* | 11/2014 | Park | G06F 19/24 |
| | | | | 707/748 |
| 2016/0232205 | A1 | 8/2016 | Nishi et al. | |

FOREIGN PATENT DOCUMENTS

| | | |
|---|---|---|
| JP | 2015-49790 A | 3/2015 |
| JP | 2015-111410 A | 6/2015 |

OTHER PUBLICATIONS

P. Tzvetkov, et al., "TSP: Mining Top-K Closed Sequential Patterns," Knowledge and Information Systems, vol. 7, Issue 4, 2005, 8 pages.

International Search Report dated Jun. 23, 2015 in PCT/JP2015/059882 Filed Mar. 30, 2015.

* cited by examiner

FIG. 2

| MINIMUM SUPPORT | 0.1 |
|---|---|
| MAXIUM NUMBER OF PATTERNS | 100 |

FIG. 3

| DATA ID | SET OF ITEMS |
|---|---|
| t1 | a, b, c, f |
| t2 | a, b, d |
| t3 | a, e, f |
| t4 | b, e, g |
| ... | ... |
| tn | e, f, g |

FIG. 5

| PATTERN ID | PATTERN | SUPPORT |
|---|---|---|
| p1 | a, b | 0.6 |
| p2 | a, e | 0.7 |
| ... | ... | ... |
| pm | a, f | 0.5 |

FIG. 6

| PATTERN ID | PATTERN | SUPPORT |
|---|---|---|
| p1 | a, b | 0.6 |
| p2 | a, e | 0.7 |
| ... | ... | ... |
| pm | a, f | 0.6 |
| pm+1 | a, b, g | 0.5 |
| ... | ... | ... |
| p100 | d, e, f | 0.7 |
| p101 | f, g | 0.7 |

FIG. 7

| PATTERN ID | PATTERN | SUPPORT |
|---|---|---|
| p2 | a, e | 0.7 |
| ... | ... | ... |
| pm | a, f | 0.6 |
| pm+1 | a, b, g | 0.5 |
| ... | ... | ... |
| p100 | d, e, f | 0.7 |
| p101 | f, g | 0.7 |

FIG. 9

| ITEM | FREQUENCY |
|---|---|
| a | 100 |
| b | 60 |
| c | 30 |
| d | 40 |
| e | 30 |
| f | 70 |
| g | 20 |

FIG. 10

| ITEM | FREQUENCY |
|---|---|
| a | 99 |
| b | 59 |
| c | 30 |
| d | 40 |
| e | 30 |
| f | 70 |
| g | 20 |

FIG. 11

| ITEM | FREQUENCY |
|---|---|
| a | 99 |
| b | 60 |
| c | 30 |
| d | 40 |
| e | 30 |
| f | 69 |
| g | 20 |

FIG. 13

| DATA ID | SET OF ITEMS |
|---------|--------------|
| s1 | {a, b}>c>f |
| s2 | a>b>d |
| s3 | a>{e, f} |
| s4 | b>e>g |
| ... | ... |
| sn | e>f>g |
| sn+1 | g>f>e |
| sn+2 | a>f>a>e |
| sn+3 | b>d>a>c |
| sn+4 | a>f>b>e |
| sn+5 | a>b>a>b |

FIG. 15

| PATTERN ID | PATTERN | SUPPORT |
|---|---|---|
| r1 | a>b | 0.6 |
| r2 | a>e | 0.7 |
| ... | ... | ... |
| rk | g>f | 0.5 |
| rk+1 | a>b>e | 0.6 |
| rk+2 | a>e>f | 0.6 |
| ... | ... | ... |
| rk+101 | g>f>f | 0.5 |

PATTERN FINDING DEVICE AND PROGRAM

TECHNICAL FIELD

Embodiments of the present invention relate to a pattern finding device and a program.

BACKGROUND ART

In the related art, there are pattern finding devices which find an arrangement of characteristic items as a pattern from a sequence data set constituted by an arrangement of discrete items with reference to an index or the like based on a frequency of the pattern. However, the pattern finding devices find a lot of patterns, which include a lot of similar patterns in some cases.

CITATION LIST

Patent Literature

[Patent Literature 1]
Japanese Patent No. 4953834

Non-Patent Literature

[Non-Patent Literature 1]
Rakesh Agrawal, Ramakrishnan Srikant, "Mining Sequential Patterns," Proceedings of the 11th International Conference on Data Engineering, p 3 to 14, Mar. 6, 1995
[Non-Patent Literature 2]
Petre Tzvetkov, Xifeng Yan, Jiawei Han, "TSP: Mining Top-K Closed Sequential Patterns," Knowledge and Information Systems, vol7, issue 4, pp. 438 to 457, 2005

SUMMARY OF INVENTION

Technical Problem

An object to be accomplished by the present invention is to provide a pattern finding device and a program capable of setting a group of patterns which is found to be a set in which there are few similar patterns.

Solution to Problem

A pattern finding device of embodiments includes a pattern generator, a pattern storage, a pattern selector, and a pattern deleter. The pattern generator generates a group of patterns from data including a plurality of items. The pattern storage stores the group of patterns generated by the pattern generator. The pattern selector selects at least one pattern to be deleted from the group of patterns with reference to an evaluated value indicating a change of an item distribution condition in the group of patterns when at least one pattern which is selected as a candidate is excluded from the group of patterns stored in the pattern storage. The pattern deleter deletes the at least one pattern that is selected by the pattern selector from the pattern storage.

BRIEF DESCRIPTION OF DRAWINGS

FIG. 2 is a table illustrating an example of stored content of a parameter storage of the first embodiment.

FIG. 3 is a table illustrating an example of stored content of a data storage of the first embodiment.

FIG. 5 is a table illustrating a first example of stored content of the pattern storage of the first embodiment.

FIG. 6 is a table illustrating a second example of stored content of the pattern storage of the first embodiment.

FIG. 7 is a table illustrating a third example of stored content of the pattern storage of the first embodiment.

FIG. 9 is a table illustrating a first example of a distribution of item frequencies stored by the pattern storage of the first embodiment.

FIG. 10 is a table illustrating a second example of a distribution of item frequencies stored by the pattern storage of the first embodiment.

FIG. 11 is a table illustrating a third example of a distribution of item frequencies stored by the pattern storage of the first embodiment.

FIG. 13 is a table illustrating an example of stored content of a data storage of the second embodiment.

FIG. 15 is a table illustrating an example of stored content of a pattern storage of the second embodiment.

DESCRIPTION OF EMBODIMENTS

Hereinafter, a pattern finding device and a program of embodiments will be described with reference to the drawings.

First Embodiment

Figure 1:
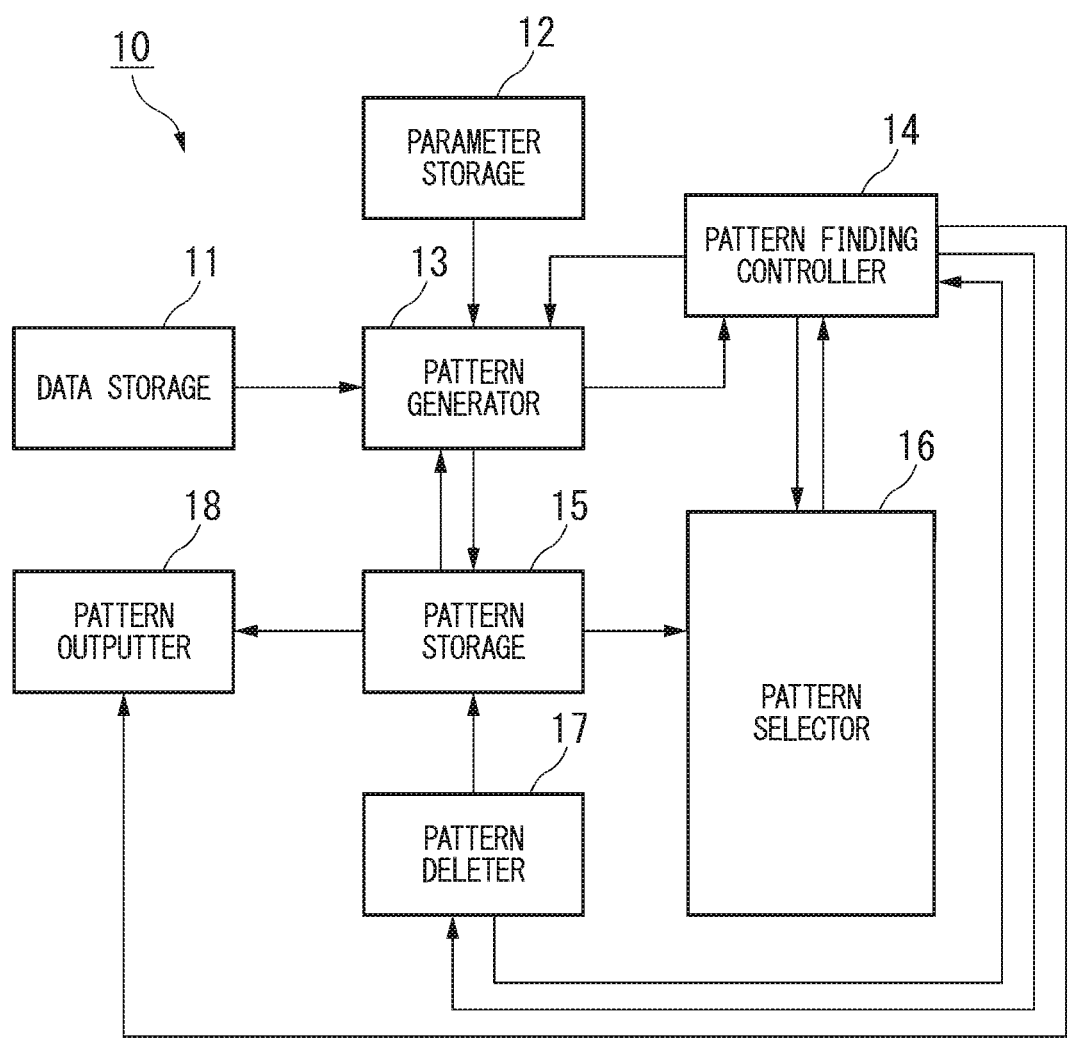
FIG. 1 is a schematic block diagram showing a constitution of a pattern finding device of a first embodiment.

FIG. 1 is a schematic block diagram showing a constitution of a pattern finding device 10 of a first embodiment. The pattern finding device 10 includes a data storage 11, a parameter storage 12, a pattern generator 13, a pattern finding controller 14, a pattern storage 15, a pattern selector 16, a pattern deleter 17, and a pattern outputter 18.

The data storage 11 stores data serving as a target of pattern detection of this device. The data serving as the target in this device is a set of items which is constituted by combining discrete items and is constituted by a plurality of sets of items. An example of items of the health care field includes a normal value of an inspection result of a specific medical examination item, but an inspection result of a specific medical examination item as an item like a medical checkup result "normal" of a medical examination item "blood pressure" can become(s) an abnormal value. Also, a set of items is obtained by collecting medical examination results of a plurality of medical examination items associated with a specific receiver. Target data is obtained by collecting such a set of items with respect to a plurality of medical examinees.

In addition, in the retail field, for example, purchased products are items, and a set of products which are purchased on a specific day by a specific customer is a set of items. Target data is obtained by collecting such a set of items according to a plurality of customers and over a plurality of days.

In the following description, items are expressed by lower-case letters for the purpose of convenience.

The parameter storage 12 stores a parameter which is referred to when the pattern generator 13 generates a pattern. The parameter storage 12 stores a minimum support and a maximum number of patterns as the parameter which is referred to by the pattern generator 13. The minimum support is a minimum value of a support to be included in the pattern which is generated by the pattern generator 13. The maximum number of patterns is a maximum number of patterns which is detected from the data stored by the data storage 11. Note that a support $D_i$ of an $i^{th}$ pattern is an evaluated value associated with a frequency of the pattern and is a value obtained by dividing the number of appearances $n_i$ of the pattern among data by the amount of data $N_T$ as represented by Expression (1). The number of appearances $n_i$ is the number of sets of items including the $i^{th}$ pattern, and the amount of data $N_T$ is the number of sets of items included in the data.

$$D_i = \frac{n_i}{N_T} \qquad (1)$$

The pattern generator 13 generates a group of patterns from the data stored by the data storage 11 by referring to the parameter stored by the parameter storage 12. The pattern generator 13 stores the generated group of patterns in the pattern storage 15. Note that the pattern generator 13 sequentially generates a pattern from a pattern having the fewest number of items, but when a pattern having a predetermined number of items is generated, a pattern having a smaller number of items than this number of items is read from the pattern storage 15.

The pattern finding controller 14 controls a processing order or the like of units of the pattern finding device 10. The pattern storage 15 stores the group of patterns which is generated by the pattern generator 13. The pattern selector 16 selects at least one pattern which will be deleted from the pattern storage 15 such that patterns which are similar to each other which are included in the group of patterns stored by the pattern storage 15 are reduced. For example, when selecting the pattern to be deleted, the pattern selector 16 refers to an evaluated value which indicates a change in an item distribution condition in the group of patterns stored in the pattern storage 15 due to the selected pattern which is excluded from the set. Details of a pattern selection using the pattern selector 16 will be described below.

The pattern deleter 17 deletes the pattern that is selected by the pattern selector 16 from the pattern storage 15. The pattern outputter 18 outputs the pattern which is stored by the pattern storage 15 in accordance with control by the pattern finding controller 14.

FIG. 2 is a table illustrating an example of stored content of the parameter storage 12. The parameter storage 12 stores a preset minimum support and a maximum number of patterns. In the example of FIG. 2, the parameter storage 12 stores a minimum support "0.1" and a maximum number of patterns "100."

FIG. 3 is a table illustrating a stored content example of the data storage 11. The data storage 11 associates a data identity (ID) which identifies a set of items with a set of items which includes one or more items and stores the association. In the example of FIG. 3, for example, a set of items which is associated with data ID "t1" and includes items "a," "b," "c," and "f" is stored. Also, a set of items which is associated with data ID "t2" and includes items "a," "b," and "d" is stored. Similarly, sets of items are associated with data IDs until data ID "tn" and stored. The pattern finding device 10 finds patterns obtained by combining items which characterize data among such data only up to the maximum number of patterns or less.

Figure 4:
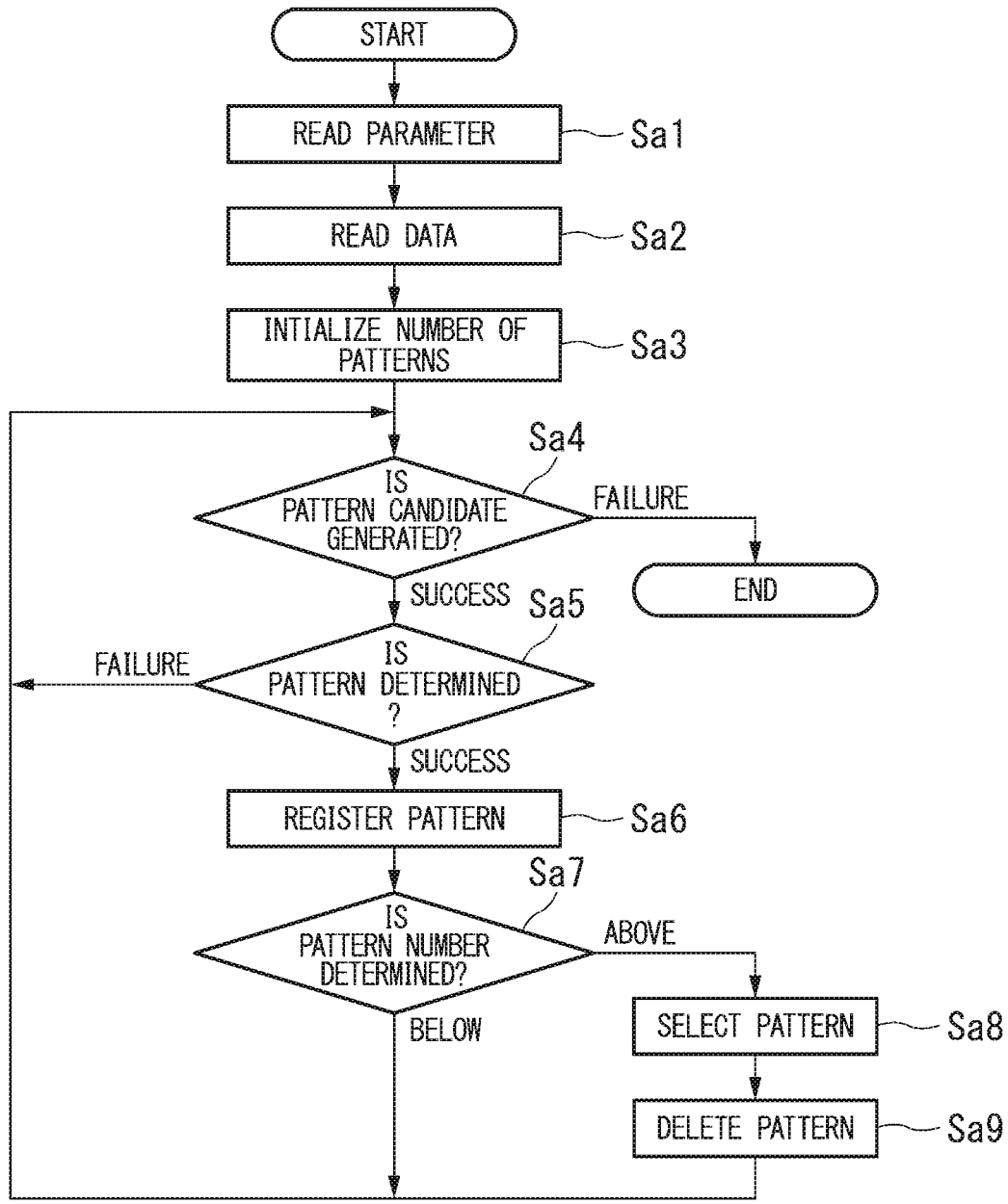
FIG. 4 is a flowchart illustrating an operation of the pattern finding device of the first embodiment.

FIG. 4 is a flowchart for describing an operation of the pattern finding device 10. First, in Step Sa1, the pattern finding controller 14 notifies the pattern generator 13 of a start of parameter reading. The pattern generator 13 which receives this notification reads a parameter stored in the parameter storage 12. Also, the pattern generator 13 notifies the pattern finding controller 14 that the parameter reading is completed at a stage at which the parameter reading is completed.

Subsequently, in Step Sa2, the pattern finding controller 14 notifies the pattern generator 13 of a start of data reading. The pattern generator 13 which receives this notification reads data stored in the data storage 11. Also, the pattern generator 13 notifies the pattern finding controller 14 that the data reading is completed at a stage at which the data reading is completed.

Subsequently, in Step Sa3, the pattern finding controller 14 initializes the number of patterns to 0 and notifies the pattern generator 13 of a start of pattern generation. Subsequently, in Step Sa4, the pattern generator 13 receives the notification of the start of pattern generation and generates one of pattern candidates. At this time, when the pattern candidate cannot be created (Sa4—Failure), the pattern generator 13 notifies the pattern finding controller 14 that a pattern generating process ends, and the pattern finding controller 14 ends the process.

On the other hand, in Step Sa4, when the pattern candidate can be generated (Sa4—Success), the pattern generator 13 notifies the pattern finding controller 14 that the pattern candidate can be generated. The pattern finding controller 14 notifies the pattern generator 13 that a process of Step Sa5 is to be performed. Note that, for example, the method disclosed in Non-Patent Literature 1 ("Mining Sequential Patterns," Proceedings of the 11th International Conference on Data Engineering, p 3 to 14, Mar. 6, 1995) can be used to generate the pattern candidate in Step Sa4, but other methods may be used.

In Step Sa5, the pattern generator 13 calculates a frequency $n_i$ of a set of items including the generated pattern candidate and calculates a support of the candidate using Expression (1). When the support is equal to or more than a minimum support which is read in Step Sa1, the pattern generator 13 determines that the pattern generation is successful (Sa5—Success) and notifies the pattern finding controller 14 that the pattern generation is successful. The pattern finding controller 14 which receives this notification notifies the pattern generator 13 that a process of Step Sa6 is to be performed. On the other hand, in Step Sa5, when the calculated support is the minimum support or less, the pattern generator 13 determines that the pattern generation of has failed (Sa5—Failure) and notifies the pattern finding controller 14 that the pattern generation has failed. The pattern finding controller 14 which receives this notification notifies the pattern generator 13 that the process of Step Sa4 is to be performed.

Here, a method of calculating a frequency of a set of items including a pattern candidate will be described in brief. The data storage 11 will be described assuming that the data storage 11 stores the example of FIG. 3. When "a, f" is generated as pattern candidates, both of items "a" and "f" are present in sets of items t1 and t3. Thus, the sets of items t1 and t3 are determined to have the pattern candidate. On the other hand, since only one of "a" and "f" is present in sets of items t2 and tn, the sets of items t2 and tn are determined not to have the pattern candidate. Also, since neither of "a" and "f" is present in a set of items 4, the set of items 4 is determined not to have the pattern candidate. The number of data which is determined to have the pattern is a frequency of the sets of items including the pattern candidate.

The pattern generator 13 calculates a support of the pattern candidate using Expression (1) on the basis of the frequency of the pattern calculated as described above.

For example, if a support of "a, f" is calculated at 0.6 when the minimum support is 0.5, the support is the minimum support or more. Thus, a process proceeds to Step Sa5. On the other hand, if the support of "a, f" is calculated at 0.4, the process proceeds to Step Sa4.

In Step Sa6, the pattern generator 13 stores the generated pattern and the support in the pattern storage 15, and 1 is added to the number of patterns. Also, the pattern generator 13 notifies the pattern finding controller 14 that the pattern is stored. The pattern finding controller 14 notifies the pattern generator 13 that a process of Step Sa7 is to be performed.

For example, if the support of the pattern candidate "a, f" is 0.6, as shown in FIG. 5, the candidate is stored as a pattern with the support, and 1 is added to the number of patterns.

In Step Sa7, the pattern generator 13 determines whether the number of patterns which is registered in the pattern storage 15 exceeds a maximum number of patterns which is read in Step Sa1 and notifies the pattern finding controller 14 of the determined result. When the number of patterns does not exceed the maximum number of patterns (Sa7—Below), the pattern finding controller 14 notifies the pattern generator 13 that Step Sa4 is to be performed. On the other hand, when the number of patterns exceeds the maximum number of patterns (Sa7—Above), the pattern finding controller 14 notifies the pattern generator 13 that Step Sa8 is to be performed.

For example, if the patterns shown in FIG. 5 are stored when the maximum number of patterns is 100, the number of patterns does not exceed the maximum number of patterns (m<100). Thus, the process proceeds to Step Sa4. On the other hand, when 101 patterns are stored in the pattern storage 15 as shown in FIG. 6, the number of patterns is the maximum number of patterns or more. Thus, the process proceeds to Step Sa8.

In Step Sa8, the pattern selector 16 selects a pattern to be deleted with reference to an evaluated value which indicates a change in an item distribution condition in the group of patterns stored in the pattern storage 15 due to the selected pattern which is excluded from the group of patterns. Thus, the pattern selector 16 selects the pattern to be deleted such that patterns which are similar to each other are reduced among the patterns stored in the pattern storage 15.

In this embodiment, at a time of selecting, the pattern selector 16 also refers to a frequency of the pattern, an entailed relationship of the pattern, or the like in addition to the evaluated value which indicates the change in the item distribution condition. Note that details of a method of selecting the pattern will be described below. The pattern selector 16 notifies the pattern finding controller 14 of the selected pattern. The pattern finding controller 14 which receives this notification notifies the pattern deleter 17 that the pattern selected by the pattern selector 16 is to be deleted, and the process proceeds to Step Sa9.

In Step Sa9, the pattern deleter 17 deletes the pattern which is notified by the pattern finding controller 14, that is, the pattern selected by the pattern selector 16 from the pattern storage 15, and 1 is subtracted from the number of patterns. Also, the pattern deleter 17 notifies the pattern finding controller 14 that the deletion of the pattern is completed. The pattern finding controller 14 which receives this notification notifies the pattern generator 13 that the process of Step Sa4 is to be performed.

For example, if the patterns of FIG. 6 are stored in the pattern storage 15 when a pattern "a, b" is selected by the pattern selector 16, the pattern deleter 17 deletes the pattern "a, b" of a pattern ID "p1" from the pattern storage 15. Thus, the patterns stored in the pattern storage 15 are as in FIG. 7.

Figure 8:
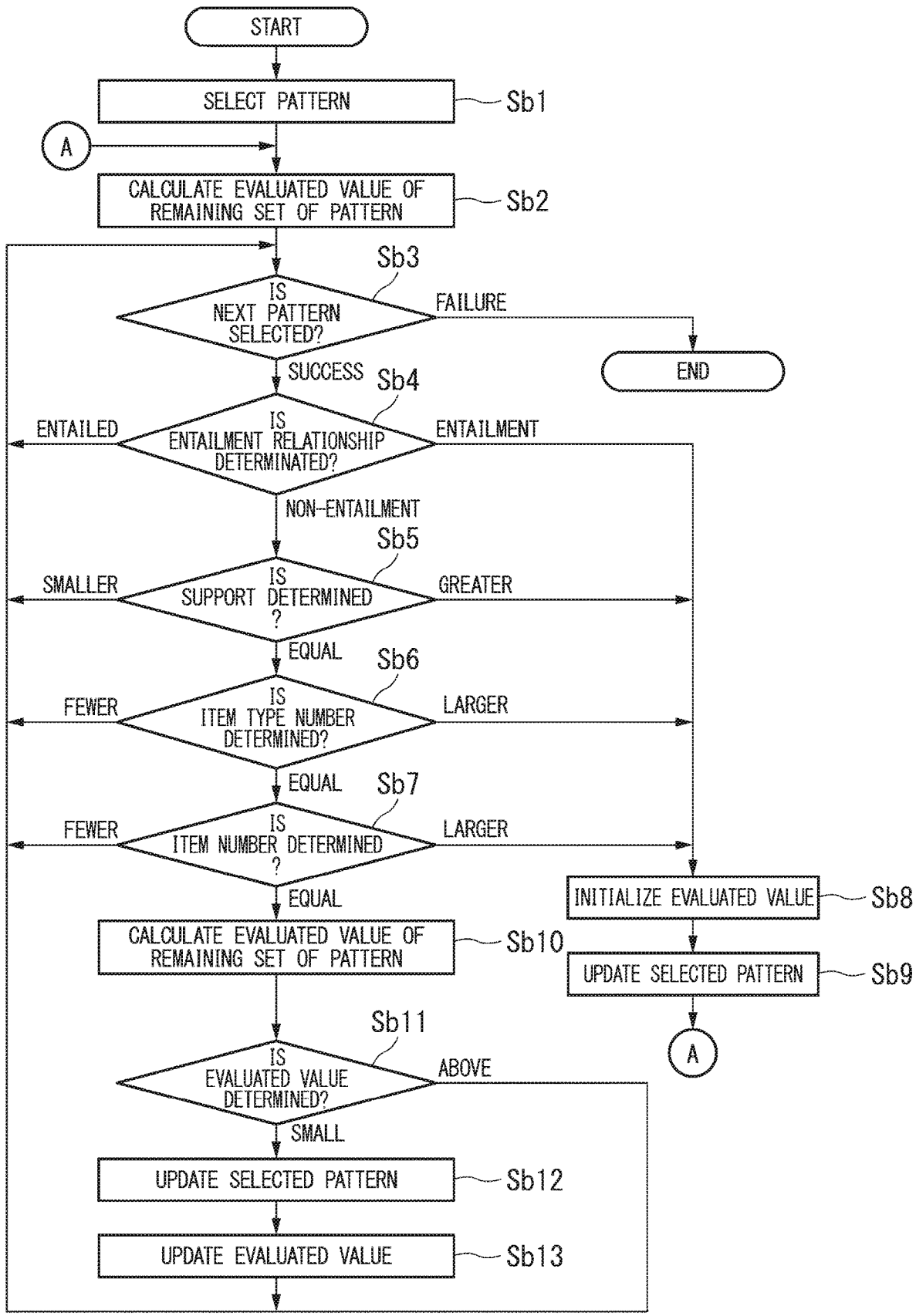
FIG. 8 is a flowchart illustrating an operation of a pattern selector of the first embodiment.

FIG. 8 is a flowchart for describing an operation of the pattern selector 16. The flowchart of FIG. 8 shows details of a pattern selection process in Step Sa8 of FIG. 4. First, in Step Sb1, the pattern selector 16 extracts one pattern from groups of patterns stored in the pattern storage 15, and the process proceeds to Step Sb2. The pattern to be extracted may be a pattern which is stored in a head of the pattern storage 15 or the like and may be determined by any criteria. At this time, since the maximum number of patterns is set to be 1 or more, a case in which there is no pattern to be extracted does not occur.

Subsequently, in Step Sb2, the pattern selector 16 calculates an evaluated value of the pattern with respect to the remaining groups of patterns when the selected pattern is removed from the groups of patterns stored in the pattern storage 15, and the process proceeds to Sb2. The evaluated value is an evaluated value which indicates a change in an item distribution condition in the groups of patterns stored in the pattern storage 15 due to the selected pattern which is exclude from the sets. For example, the pattern selector 16 calculates an evaluated value $E_i$ which is associated with an $i^{th}$ pattern of the pattern storage 15 using Expression (2).

$$E_i = 1 - \frac{\sigma_i}{\sigma_T} \quad (2)$$

Here, $\sigma_i$ is a distribution of item frequencies in a set in which the $i^{th}$ pattern is excluded from the groups of patterns stored in the pattern storage 15. Also, or is item frequencies in the groups of patterns which are stored in the pattern storage 15. A greater evaluated value refers to a reduced distribution in the item frequencies in the groups of patterns which are stored in the pattern storage 15 caused by deleting the pattern.

Therefore, a set obtained by further averaging the item frequencies can be acquired by deleting a pattern having a grater evaluated value. When patterns which are similar to each other are included in the group of patterns, deviation is generated in the item frequencies. Thus, a set in which the deviation of the item frequencies is smaller is acquired with reference to the evaluated value so that a set in which similar patterns are reduced can be expected to be acquired.

A case in which a distribution of item frequencies which are included in the groups of patterns stored in the pattern storage 15 is given in FIG. 9 will be described as an example. A selected pattern is the pattern "a, b." Frequencies of items "a" and "b" are reduced by 1 by deleting the pattern "a, b" from the distribution of the item frequencies of FIG. 9 so that the distribution of the item frequencies becomes as in FIG. 10. The distributions of the item frequencies in the frequency distributions of FIGS. 9 and 10 are 685.7143 and 668.7755, respectively. An evaluated value of the pattern "a, b" which is calculated by Expression (2) is 0.024702 (≈1-668.7755/685.7143).

Returning to the explanation of FIG. 8, in Step Sb3, the pattern selector 16 extracts one pattern that is not yet selected among the groups of patterns stored in the pattern storage 15. At this time, when there is no pattern to be extracted (Sb3—Failure), a process of the pattern selector 16 ends. On the other hand, when the pattern is extracted (Sb3—Success), the process proceeds to Step Sb4.

In Step Sc4, the pattern selector 16 determines an entailed relationship of two patterns which are selected with respect to the patterns. When a pattern which is previously selected is entailed in a pattern which is selected later (Sb4—Entailed), the process proceeds to Step Sb3. Also, when the pattern which is previously selected entails the pattern which is selected later (Sb4—Entailment), the process proceeds to Step Sb8. When there is no entailment relationship between the pattern which is previously selected and the pattern which is selected later (Sb4—Non-entailment), the process proceeds to Step Sb5.

Here, the entailment relationship of the patterns is evaluated using items which constitute the patterns. To be specific, the pattern selector 16 determines that there is an entailment relationship when a set of items which is included in one of the patterns is a partial set of a set of items which is included in the other of the patterns. For example, when the pattern which is previously selected is "a, b" and the pattern which is selected later is "a, b, c," the pattern which is previously selected is included in the pattern which is selected later. In this case, the pattern which is previously selected is determined to be entailed in the pattern which is selected later, and the process proceeds to Step Sb3.

On the contrary, when the pattern which is previously selected is "a, b, c" and the pattern which is selected later is "a, b," the pattern which is previously selected includes the pattern which is selected later. For this reason, the pattern which is previously selected is determined to entail the pattern which is selected later, and the process proceeds to Step Sb8. On the other hand, when the pattern which is previously selected is "a, b" and the pattern which is selected later is "a, f," there is no entailment relationship. Thus, a relationship is determined to be non-entailment, and the process proceeds to Step Sb5.

In Step Sb5, the pattern selector 16 compares supports of patterns which are associated with two patterns which are selected and evaluates a magnitude relationship thereof. When a support of the pattern which is previously selected is smaller than a support of the pattern which is selected later (Sb5—Smaller), the process proceeds to Step Sb3. On the contrary, when the support of the pattern which is previously selected is greater than the support of the pattern which is selected later (Sb5—Greater), the process proceeds to Step Sb8. Also, when the support of the pattern which is previously selected is equal to the support of the pattern which is selected later (Sb5—Equal), the process proceeds to Step Sb6. Note that, in Step Sb5, the pattern selector 16 may determine the support to be greater or smaller only when there is a predetermined difference or more between the supports and may determine the support to be equal when there is less than the predetermined difference between the supports.

For example, the pattern which is previously selected is "a, b," the pattern which is selected later is "a, e," and the supports shown in FIG. 6 are given to the patterns. At this time, since a support of the pattern "a, b" is given to be 0.6 and a support of a pattern "a, e" is given to be 0.7, the support of the pattern "a, b" which is previously selected is determined to be smaller. As a result, the process proceeds to Step Sb3.

On the contrary, when the pattern which is previously selected is "a, e" and the pattern which is selected later is "a, b," the support of the pattern which is previously selected is determined to be greater, and the process proceeds to Step Sc8. On the other hand, when the pattern which is previously selected is "a, b" and the pattern which is selected later is "a, f," the supports thereof are equal to 0.6. Thus, they are determined to be equal, and the process proceeds to Step Sb6.

In Step Sb6, the pattern selector 16 compares the numbers of types of items which constitute two patterns which are selected and evaluates a magnitude relationship of the numbers of types of items. A type of item may be a combination of an item name and a value of an item, an item name of the item, and a type of item name of the item. In the health care field, for example, a combination of a medical examination item and a result thereof, the medical examination item, and the like are included in the type of item. Also, in the retail field, for example, a type of purchased product is included in the type of item.

In Step Sb6, when the number of types of items of the pattern which is previously selected is fewer than the number of types of items of the pattern which is selected later (Sb6—Fewer), the process proceeds to Step Sb3. On the contrary, when the number of types of items of the pattern which is previously selected is larger than the number of types of items of the pattern which is selected later (Sb6—Larger), the process proceeds to Step Sb8. Also, when the number of types of items of the pattern which is previously selected is equal to the number of types of items of the pattern which is selected later (Sb6—Equal), the process proceeds to Step Sb7.

For example, the pattern which is previously selected is "a, b," the pattern which is selected later is "a, e, f," and the numbers of types of items which constitute the patterns are 2 and 3. At this time, the number of types of items of the pattern which is previously selected is fewer, and the process proceeds to Step Sb3. On the contrary, when the pattern which is previously selected is "a, e, f" and the pattern which is selected later is "a, b," the number of types of items of the pattern which is previously selected is determined to be larger, and the process proceeds to Step Sb6. On the other hand, when the pattern which is previously selected is "a, b," the pattern which is selected later is "a, f," and both of the numbers of types of items are 2, the numbers of types of items of the patterns are determined to be equal. Thus, the process proceeds to Step Sb7.

In Step Sb7, the numbers of items which constitute two patterns which are selected are compared, and a magnitude relationship of the numbers of items is evaluated. When the number of items of the pattern which is previously selected is fewer than the number of items of the pattern which is selected later (Sb7—Fewer), the process proceeds to Step Sb3. On the contrary, when the number of items of the pattern which is previously selected is larger than the number of items of the pattern which is selected later (Sb7—Larger), the process proceeds to Step Sb8. Also, when the number of items of the pattern which is previously selected is equal to the number of items of the pattern which is selected later (Sb7—Equal), the process proceeds to Step Sb10.

For example, when the pattern which is previously selected is "a, b" and the pattern which is selected later is "a, e, f," the numbers of items which constitute the patterns are 2 and 3, respectively. For this reason, the number of items of a pattern which is previously given is fewer, and the process proceeds to Step Sb3. On the contrary, when the pattern which is previously given is "a, e, f" and a pattern which is given later is "a, b," the number of items of the pattern which is previously given is determined to be larger, and the process proceeds to Step Sb8.

On the other hand, when the pattern which is previously selected is "a, b" and pattern which is selected later is "a, f," both of the numbers of items are 2, and the numbers of items are determined to be equal. Thus, the process proceeds to Step Sb10. Here, when the number of types of items is the number of items such as when overlapping of items which constitute patterns is not acknowledged in a pattern finding problem, it is sufficient to just perform both Step Sb6 and Step Sb7.

In Step Sb8, the pattern selector 16 initializes an evaluated value of a pattern which is calculated with respect to a group of patterns in which the pattern which is previously selected is excluded. Subsequently, in Step Sb9, after the pattern selector 16 updates the selected pattern by setting a current pattern which is selected later to be a new pattern which is previously selected, the process proceeds to Step Sb2. Thus, an evaluated value of the new pattern which is previously selected is calculated.

On the other hand, in Step Sb10, the pattern selector 16 calculates an evaluated value when the pattern which is selected later is excluded from the groups of patterns stored in the pattern storage 15 using Expression (2). For example, the groups of patterns of the frequency distribution shown in FIG. 9 are stored in the pattern storage 15, and the pattern which is selected later has the pattern "a, f." At this time, an evaluated value of the pattern is 0.028869 ($\approx$1−665.9184/ 685.7143).

Referring again to FIG. 8, in Step Sb11, the pattern selector 16 evaluates a magnitude relationship of an evaluated value of the pattern which is previously selected and an evaluated value of the pattern which is selected later. When the evaluated value of the pattern which is previously selected is equal to or more than the evaluated value of the pattern which is selected later (Sb11—Above), the process proceeds to Step Sb3. When the evaluated value of the pattern which is previously selected is smaller than the evaluated value of the pattern which is selected later (Sb1— Below), the process proceeds to Step Sb12.

For example, when the pattern which is previously selected is "a, b" and the pattern which is selected later is "a, f" as described in Step Sb2 and Step Sb10, evaluated values thereof are 0.024702 and 0.028869. Therefore, the evaluated value of the pattern which is previously selected is determined to be smaller, and the process proceeds to Step Sb12. On the contrary, when the pattern which is previously selected is "a, f" and the pattern which is selected later is "a, b," the evaluated value of the pattern which is previously selected is equal to or more than the evaluated value of the pattern which is selected later. Therefore, the process proceeds to Step Sb3. In this embodiment, when the evaluated values are equal to each other, the process proceeds to Step Sb3 and the pattern which is previously selected remains, but the process proceeds to Step Sb12 and the pattern which is selected later may remain.

In Step Sb12, the pattern selector 16 updates the selected pattern by setting a current pattern which is selected later to be a new pattern which is previously selected. Subsequently, in Step Sb13, the pattern selector 16 updates the evaluated value by setting an evaluated value of the new pattern which is previously selected to an evaluated value of an original pattern which is selected later. Subsequently, the process proceeds to Step Sb3.

As described above, in Step Sb11 of FIG. 8, when the evaluated value of the pattern which is previously selected is smaller, a pattern which is selected later having a greater evaluated value is set to be a new pattern which is previously selected. Thus, the pattern having the greater evaluated value becomes a target to be deleted. Therefore, patterns in which diversity of items constituting the patterns stored in the pattern storage 15 is maintained and which are not similar to each other can remain in the groups of patterns stored in the pattern storage 15.

The pattern finding device 10 can suppress a plurality of similar patterns from being found by deleting a pattern which is meaningless due to an overly small appearance frequency using a minimum support and deleting a pattern having an entailment relationship or a pattern having low diversity of items. Also, a large amount of patterns can be suppressed from being found by designating an upper limit of the pattern to be found, and a failure of pattern finding due to an excessive increase in calculation time or insufficient memory can be avoided.

As described above, the pattern selector 16 selects a pattern from the group of patterns stored in the pattern storage 15 with reference to an evaluated value which indicates a change in the item distribution condition in the group of patterns due to the selected pattern which is excluded from the group of patterns. Also, the pattern deleter 17 deletes the pattern that is selected by the pattern selector 16 from the pattern storage 15.

Thus, in the groups of patterns stored in the pattern storage 15, a pattern in which item frequencies are further averaged can be deleted. When similar patterns are included in a group of patterns, deviation is generated in the item frequencies. Thus, the pattern in which the item frequencies are further averaged is deleted so that a found group of patterns can be expected to be a set in which there are few sets of similar patterns.

Second Embodiment

Figure 12:
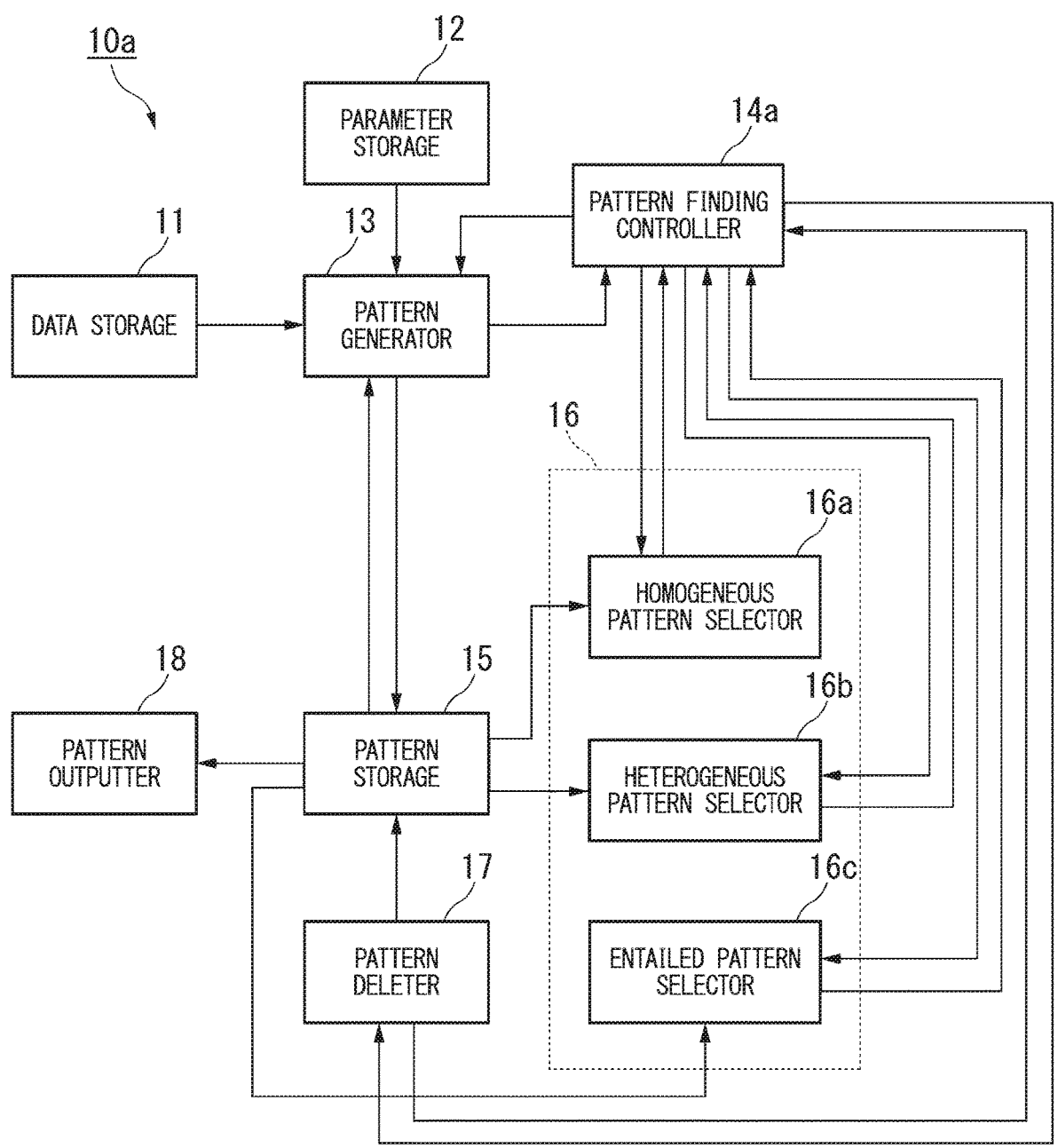
FIG. 12 is a schematic block diagram showing a constitution of a pattern finding device of a second embodiment.

FIG. 12 is a schematic block diagram showing a constitution of a pattern finding device 10a of a second embodiment. In the drawing, portions corresponding to the units of FIG. 1 are denoted by the same reference numerals and overlapping descriptions thereof will be omitted. The pattern finding device 10a includes a data storage 11a, a parameter storage 12, a pattern generator 13, a pattern finding controller 14a, a pattern storage 15, a homogeneous pattern selector 16a, a heterogeneous pattern selector 16b, an entailed pattern selector 16c, a pattern deleter 17, and a pattern outputter 18. In this embodiment, the homogeneous pattern selector 16a, the heterogeneous pattern selector 16b, and the entailed pattern selector 16c act as the pattern selector 16.

The data storage 11a stores data serving as a target of pattern detection of the pattern finding device 10a. The data is constituted by sets of items and also has an order appearance of the items. FIG. 13 is a table illustrating an example of stored content of the data storage 11a. In the example of FIG. 13, units which are generated in the same order are represented in units which are separated by ">." In addition, as an order of a unit is represented toward the right, it is later in different orders. Therefore, in a set of items of data ID "s1," items "a" and "b" are generated in the same order, and then an item "c" and an item "f" are sequentially generated in different orders.

In sets of items of data IDs "sn" and "sn+1," the items to be constituted are exactly the same, but orders in which the items appear are different. Therefore, these sets of items are not the same. Also, as shown in an example of data ID "sn+2," the same plurality of items can appear in different ranks.

The pattern finding controller 14a controls a processing order or the like of units of the pattern finding device 10a like the pattern finding controller 14 of FIG. 1. Here, the processing order thereof is different from that of the pattern finding controller 14. Thus, the number of patterns which are included in the patterns stored in the pattern storage 15 and in which the numbers of partial sets of the items are the same is equal to or less than a predetermined maximum number of the same type of patterns. Also, the number of patterns which are included in the patterns stored in the pattern storage 15 is equal to or less than a predetermined maximum number of patterns.

The homogeneous pattern selector 16a (a pattern selector) selects a pattern to be deleted from the patterns stored in the pattern storage 15 among groups of patterns (homogeneous sets) in which the numbers of items are the same. The homogeneous pattern selector 16a selects the pattern to be deleted like the pattern selector 16 of FIG. 1.

The heterogeneous pattern selector 16b (a pattern selector) selects a pattern to be deleted from a set of all of the patterns stored in the pattern storage 15. The heterogeneous pattern selector 16b selects the pattern to be deleted like the pattern selector 16 of FIG. 1. Here, as will be described below, since a process is performed in a state in which an entailed pattern is deleted, a process of the heterogeneous pattern selector 16b may not include Step Sb4.

The entailed pattern selector 16c selects an entailed pattern which is entailed in one of the patterns stored by the pattern storage 15 from the patterns to delete the entailed pattern.

Figure 14:
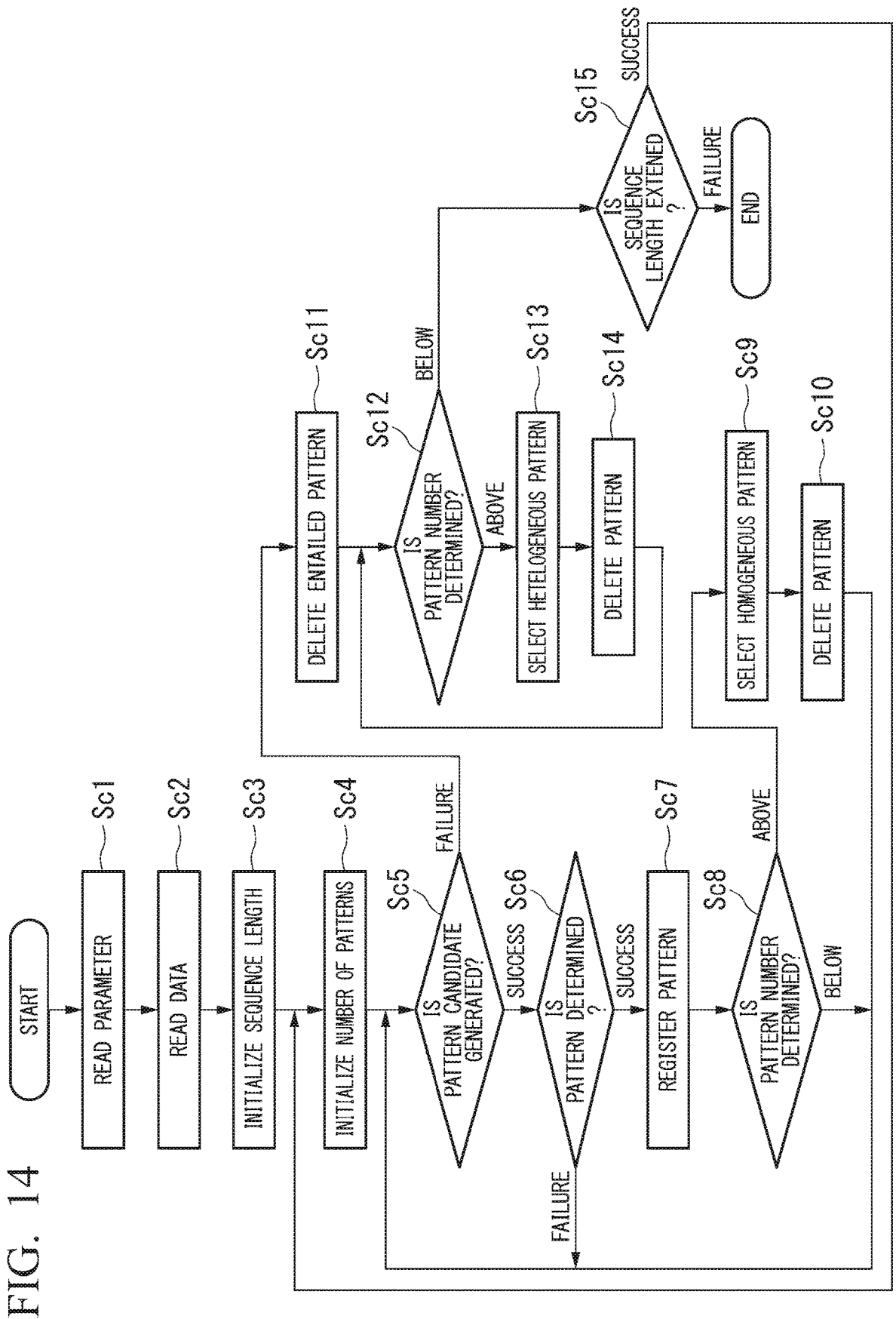
FIG. 14 is a flowchart illustrating an operation of the pattern finding device of the second embodiment.

FIG. 14 is a flowchart for describing an operation of the pattern finding device 10a. Since Steps Sc1 and Sc2 are the same as Steps Sa1 and Sa2 of FIG. 4, overlapping descriptions thereof will be omitted. Subsequently, in Step Sb3, since the pattern generator 13 sequentially finds a pattern from a unit having a short sequence length, the pattern finding controller 14a sets the sequence length to be 1. Here, the sequence length is the number of partial sets of items which are generated in the same rank in a combination of items which constitute a pattern. For example, in the case of a set of items of data ID "s1" of FIG. 13, since there are partial sets of items which belong to "{a, b}," "c," and "f" in three different orders, a length thereof is 3.

In Step Sc4, the pattern finding controller 14a initializes the number of patterns to 0 and notifies the pattern generator 13 of a start of pattern generation at a set sequence length. Subsequently, in Step Sc5, the pattern generator 13 receives the notification of the start of pattern generation in the set sequence length and generates a pattern candidate. When the generation has failed (Sc5—Failure), the process proceeds to Step Sc11. When the generation is successful (Sc5—Success), the process proceeds to Step Sc6.

In Step Sc6, the pattern generator 13 calculates a frequency of data including the generated pattern candidate with reference to data stored in the data storage 11a and calculates a support thereof using Expression (1). At this time, the pattern generator 13 determines whether the calculated support is equal to or more than a minimum support which is read from the parameter storage 12 and notifies the pattern finding controller 14a of the determined result. When the pattern finding controller 14a receives the determined result and the determined result is equal to or more than the minimum support, the process proceeds to Step Sc7. On the other hand, when the determined result is smaller than the minimum support, the process of the pattern finding controller 14a proceeds to Step Sc5.

Here, in calculating the frequency of the pattern, an entailment relationship between the data and the pattern is evaluated in consideration of whether order relationships of items which constitute the pattern also coincide with each other. For example, "a>b" is generated as the pattern candidate. At this time, in the data of FIG. 13, data including the pattern candidate will be described. Since "a" and "b" are items which are simultaneously generated in the case of the set of items of the data ID "s1," this is different from an order relationship between the items "a" and "b" in the pattern candidates, and the items "a" and "b" are thus determined not to be included. Similarly, since an appearance order of the items is opposite to that of the pattern candidates in a set of items of data ID "sn+3," the items are determined not to be included.

On the other hand, in a set of items of data ID "sn+4," an item "f" is included in the middle of the order, but the order relationship of the item "a" and the item "b" is maintained. Thus, the pattern candidate is determined to be included. Also, in a set of items of data ID "sn+5," the item "a" and the item "b" appear twice in order of "b" which is subsequent to "a," but whether the item "a" and the item "b" are determined as in an item set unit is determined. Thus, a frequency of the pattern candidate with respect to the set of items is determined to be 1. In addition, a set of items of data ID "s2" is determined to include the pattern candidate.

In Step Sc7 and Step Sc8, a process which is similar to the pattern registration of Step Sa6 and the pattern number determination of Step Sa7 in FIG. 4 is performed so that the process proceeds to either Step Sb4 or Step Sb9. Here, in the pattern registration of Step Sa6 and the pattern number determination of Step Sa7, the number of patterns in a sequence length serving as a current generation target and a pattern having a sequence length which is shorter than the current sequence length are separately managed.

For example, when a length of the current sequence length is 3 and a 101-st pattern with a length of 3 "g>f>f" is registered, the pattern is registered as shown in FIG. 15. In the example of FIG. 15, k (≤100) patterns of which the sequence length is 2 or less are registered in addition to patterns with a sequence length of 3.

In Step Sc9, the homogeneous pattern selector 16a performs a process which is similar to the pattern selection of Step Sa8 in FIG. 4 on a group of patterns of which a sequence length coincides with the current sequence length so that a pattern to be deleted is selected.

For example, a case in which any pattern is selected from two patterns such as patterns "a>f>b" and "b>f>{a, f}" in which supports are equal to each other will be described as an example. At this time, types of items which constitute the pattern are "a," "b," and "f" and there are three types in any pattern case, but the number of items of the former is 4. Thus, the pattern "a>f>b" of the former is selected as a pattern to be deleted.

Figure 11:
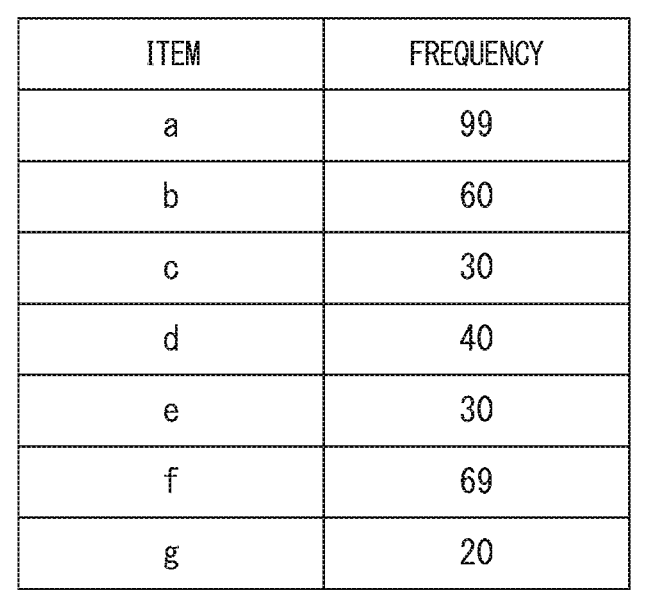

Also, a case in which any pattern is selected from two patterns "a>b" and "a>f" of which supports are equal to each other will be described as an example. At this time, if the distribution of item frequencies of the groups of patterns is given in FIG. 9, the distributions of the item frequencies when the pattern "a>b" is excluded and when the pattern "a>f" is excluded are given in FIG. 10 and FIG. 11. For this reason, evaluated values of the patterns "a>b" and "a>f" are 0.024702 and 0.028869 like in the example in the case of FIG. 4. Thus, the pattern "a>f" is selected as the pattern to be deleted.

In Step Sc10, a process which is similar to the pattern deletion of Step Sa9 in FIG. 4 is performed so that a pattern which is selected by the homogeneous pattern selector 16a is deleted from the patterns stored in the pattern storage 15. Also, 1 is subtracted from the number of patterns, and the process proceeds to Step Sc5.

On the other hand, in Step Sc11, the entailed pattern selector 16c determines a pattern which has an inclusive relationship with one of patterns of a current sequence length, that is, an entailed pattern, among the patterns stored in the pattern storage 15. The pattern deleter 17 deletes a pattern determined to be entailed. In generating the pattern using the pattern generator 13, a pattern of a lower order of which a sequence length is one step shorter than the current sequence length is necessary to generate a pattern candidate of the current sequence length. For this reason, the pattern of the lower order which is short by one step is stored in the pattern storage 15 at a stage at which the pattern of the current sequence length is generated.

On the other hand, a pattern of one lower order is not required in a state in which the generation of the current sequence length ends. Thus, the pattern entailed in the current sequence length is deleted so that the number of patterns stored in the pattern storage 15 is reduced. Note that details of the entailed pattern selector 16c will be described below.

In Step Sc12, the pattern generator 13 determines that the number of patterns which are registered in the pattern storage 15 is the maximum number of patterns or more without considering the sequence length and notifies the pattern finding controller 14a of the determined result. When the number of patterns is the maximum number of patterns or less (Sc12—Below), the pattern finding controller 14a causes the process to proceed to Step Sc15. On the other hand, when the number of patterns exceeds the maximum number of patterns (Sc12—Above), the process proceeds to Step Sb13. Note that the maximum number of patterns Step Sc8 may be the same as or may be different from the maximum number of patterns of Step Sc12.

In Step Sc13, the heterogeneous pattern selector 16b selects one pattern to be deleted by performing the same process as the pattern selection of Step Sa8 in FIG. 4 without considering the sequence length. The heterogeneous pattern selector 16b notifies the pattern finding controller 14a of the selected pattern. The pattern finding controller 14a causes the process to proceed to Step Sc14.

In Step Sc14, the pattern deleter 17 performs the same process as the pattern deletion of Step Sa9 in FIG. 4. Thus, the pattern which is selected by the heterogeneous pattern selector 16b is deleted from the patterns which are stored in the pattern storage 15. Also, 1 is subtracted from the number of patterns, and the process proceeds to Step Sc12. A series of processes of Step Sc12 to Step Sc14 are repeated until the number of patterns which are stored in the pattern storage 15 becomes the maximum number or less.

In Step Sc15, the pattern generator 13 determines whether the current sequence length can be extended and notifies the pattern finding controller 14a of the result. When the sequence length can be extended (Sc15—Success), the pattern finding controller 14a adds 1 to the sequence length and causes the process to proceed to Step Sc4. On the other hand, when the sequence length cannot be extended (Sc15—Failure), the process of this device ends.

Here, whether the sequence length can be extended can be determined in accordance with whether there is at least one pattern which coincides with the current sequence length in the pattern storage 15. In addition, when there is at least one pattern, the pattern generator 13 determines that it is possible to extend the sequence length.

Figure 16:
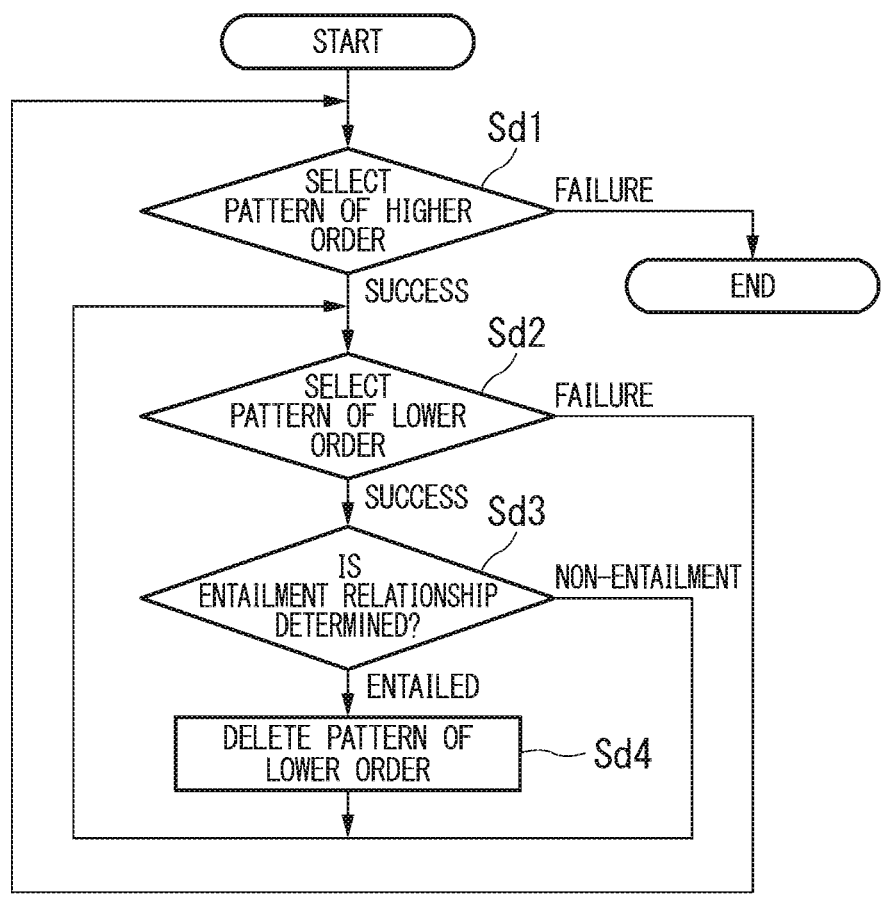
FIG. 16 is a flowchart illustrating an operation of an entailed pattern selector of the second embodiment.

FIG. 16 is a flowchart for describing an operation of the entailed pattern selector 16c. In the flowchart of FIG. 16, details of Step Sc11 of FIG. 14 are described. First, in Step Sd1, the entailed pattern selector 16c extracts one pattern as a pattern of higher order from patterns which are not yet extracted using a pattern of a current sequence length stored in the pattern storage 15. At this time, the entailed pattern selector 16c notifies the pattern finding controller 14a whether the pattern is extracted. The pattern finding controller 14a causes the process to proceed to Step Sd2 when the pattern of higher order is extracted (Sd1—Success), but causes the entailed pattern deletion of Step Sc11 to end when the pattern of higher order cannot be extracted (Sd1—Failure).

In Step Sd2, the entailed pattern selector 16c extracts one pattern as a pattern of lower order from patterns which are stored in the pattern storage 15, which are one step shorter than the current sequence length, and which are not yet extracted. At this time, the entailed pattern selector 16c notifies the pattern finding controller 14a of whether to extract the pattern. The pattern finding controller 14a causes the process to proceed to Step Sd3 when the pattern of lower order is extracted (Sd2—Success), but causes the process to proceed to Step Sd1 when the pattern of lower order cannot be extracted (Sd2—Failure).

In Step Sd3, the entailed pattern selector 16c determines whether the pattern of higher order entails the pattern of lower order and notifies the pattern finding controller 14a of the result. The pattern finding controller 14a causes the process to proceed to Step Sd4 when the pattern of higher order entails the pattern of lower order (Sd4—Entailed), and causes the process to proceed to Step Sd2 when the pattern of higher order does not entail the pattern of lower order (Sd4—Non-entailment) in accordance with a determined result of the entailment relationship.

For example, when "a>b>f" is selected as the pattern of higher order and one of "a>b," "a>f," and "b>f" as the pattern of lower order, the entailed pattern selector 16c determines an entailed relationship. On the other hand, when the patterns of higher order are the same and one of "b>a," "f>a," and "f>b" is selected as the pattern of lower order, the entailed pattern selector 16c determines a non-entailment relationship.

In Step Sd4, the pattern deleter 17 deletes the pattern of lower order determined to be entailed in Step Sd3 from the pattern storage 15 and subtracts 1 from the number of patterns. Also, the pattern finding controller 14a is notified of the deletion of the pattern. The pattern finding controller 14a causes the process to proceed to Step Sd2.

The process as described above is performed so that the pattern finding device 10a can find characteristic patterns of the maximum number of patterns or less in which an appearance order of items constituting data or the patterns is considered.

In the above-described embodiments, the pattern selector 16, the homogeneous pattern selector 16a, and the heterogeneous pattern selector 16b operate as illustrated in FIG. 8, but an order of entailment relationship determination, support determination, item type number determination, item number determination, and evaluated value determination may differ.

In addition, another criterion can also be used in which similarity between patterns is evaluated as an evaluated value of a pattern, and similarity in which an appearance order of the patterns is considered can also be evaluated.

In the pattern selector 16, the homogeneous pattern selector 16a, and the heterogeneous pattern selector 16b, three types of determinations such as entailment, entailed, and non-entailment determinations are performed, but the patterns which are stored in the pattern storage 15 are sorted using a criterion such as an appearing order and a sequence length order of the items so that the patterns can also be constituted to be able to be determined to be entailed or non-entailment.

In the above-described embodiments, in the evaluated value $E_i$, a set in which a selected pattern is excluded from the pattern storage 15 (a deleted set) may have a value which is greater than a set in which the selected pattern is stored in the pattern storage 15 (an original set) as the set is closer to the state in which the item frequencies thereof are averaged. For example, the evaluated value may be a value obtained by subtracting a distribution of item frequencies in the deleted set from a distribution of item frequencies in the original set. Such an evaluated value $E_i$ is calculated, for example, using Expression (3) as well as Expression (2).

$$E_i = \sigma_T - \sigma_i \quad (3)$$

In the above-described embodiments, in the evaluated value $E_i$, a set in which a selected pattern is excluded from the pattern storage 15 may have a value that is smaller than a set in which the selected pattern is stored in the pattern storage 15 as the set is closer to the state in which the item frequencies thereof are averaged. For example, the evaluated value $E_i$ may be calculated using Expression (4). Here, in this case, when an evaluated value of a pattern which is previously selected is greater than an evaluated value of a pattern which is selected later based on a determination in Step Sb11 of FIG. 8, the process proceeds to Step Sb12.

$$E_i = \sigma_i - \sigma_T \quad (4)$$

In the above-described embodiments, the pattern selector 16, the homogeneous pattern selector 16a, and the heterogeneous pattern selector 16b select a pattern having the greatest evaluated value among patterns in which predetermined conditions using an inclusive relationship of patterns, values indicating frequencies of the patterns, the number of items constituting the patterns, the number of types of items constituting the patterns, and the like are satisfied, but some or all of them may be referred to.

According to at least one embodiment described above, a pattern selector configured to select a pattern from the pattern storage 15 with reference to the above-described evaluated value, and the pattern deleter 17 configured to delete a pattern that is selected by the pattern selector from the pattern storage 15 are provided so that groups of patterns stored in the pattern storage 15 can be set to be a set in which there are few similar patterns.

A program for realizing a function of the pattern finding device 10 in FIG. 1 or the pattern finding device 10a in FIG. 12 is recorded on a computer-readable recording medium, and the program recorded on this recording medium is read by and executed in a computer system so that the pattern finding device 10 or 10a may be realized. Note that the "computer system" described herein is assumed to include an operating system (OS) and hardware such as peripheral devices.

The "computer-readable recording medium" refers to a portable medium such as a flexible disk, a magneto optical disc, a read-only memory (ROM), a compact disc read-only memory (CD-ROM), and a storage device such as hard disk built in a computer system. The "computer-readable recording medium" is also assumed to include a medium which dynamically holds a program for a short period of time such as a communication line in a case in which a program is transmitted via a network such as the Internet or a communication line such as a telephone line and a medium which stores a program during a certain period of time such as a volatile memory inside the computer system serving as a server or a client in the case. The above-described program may be a program for realizing a portion of the above-described function and may be realized by combination with a program in which the above-described function is recorded on the computer system in advance.

Some embodiments of the present invention have been described, but the embodiments are presented as examples and are not intended to limit the scope of the present invention. The embodiments can be carried out in various other forms, and various omissions, replacements, and changes are possible without departing from the essence of the present invention. The embodiments and modifications thereof are included in the range and the essence of the present invention and are included in the invention disclosed in the claims and the range equivalent thereto.

REFERENCE SIGNS LIST 10, 10a Pattern finding device
11 Data storage
12 Parameter storage
13 Pattern generator
14, 14a Pattern finding controller
15 Pattern storage
16 Pattern selector
16a Homogeneous pattern selector
16b Heterogeneous pattern selector
16c Entailed pattern selector
17 Pattern deleter
18 Pattern outputter

What is claimed is:

1. A pattern finding device comprising:
a processor configured to:
generate a group of patterns from data including a plurality of items, the plurality of items including a plurality of purchased retail items or a plurality of medical examination items, the generated group of patterns including a specific frequency of occurrence of each item;
store the group of patterns in a memory;
select, from the group of patterns stored in the memory, at least one pattern to be deleted from the group of patterns with reference to (i) an upper limit for the frequency of occurrence of each item and (ii) an evaluated value indicating a change of an item distribution condition from the group of patterns to a group which is generated by excluding at least one candidate pattern in the group of patterns such that the item distribution condition is closer to a state in which each frequency of occurrence of each item is equal within the group of patterns; and
delete the at least one pattern that is selected.

2. The pattern finding device according to claim 1, wherein the evaluated value has a greater value or a smaller value as the item distribution condition is closer to a state in which each item is equal within the group of patterns.

3. The pattern finding device according to claim 2, wherein the evaluated value is a value indicating a decrease in distribution of the item in the group of patterns.

4. The pattern finding device according to claim 3, wherein the processor is configured to select a pattern having a greatest decrease indicated by the evaluated value as at least one pattern to be deleted among patterns which are included in the group of patterns and which satisfy a predetermined condition.

5. The pattern finding device according to claim 4, wherein the predetermined condition is a condition which uses at least one of an inclusive relationship of the patterns included in the group of patterns, values indicating frequencies of the patterns included in the group of patterns, a number of items constituting the patterns included in the group of patterns, and a number of types of items constituting the patterns included in the group of patterns.

6. The pattern finding device according to claim 1, wherein the processor is configured to:
   select the at least one pattern to be deleted, which is included in the group of patterns, with reference to an evaluated value indicating a change of an item distribution condition in homogeneous sets when the at least one pattern which is selected as the candidate is excluded from the homogeneous sets including patterns in which the numbers of items are the same; and
   select a pattern included in one of the patterns included in the set of patterns as a pattern to be deleted from the pattern storage among the patterns included in the group of patterns.

7. A non-transitory computer readable medium that stores a computer program, when executed by a computer, to cause the computer to perform:
   generating a group of patterns from data including a plurality of items, the plurality of items including a plurality of purchased retail items or a plurality of medical examination items, the generated group of patterns including a specific frequency of occurrence of each item;
   storing the group of patterns in a memory;
   selecting, from the group of patterns stored in the memory, at least one pattern to be deleted from the group of patterns with reference to (i) an upper limit for the frequency of occurrence of each item and (ii) an evaluated value indicating a change of an item distribution condition from the group of patterns to a group which is generated by excluding at least one candidate pattern in the group of patterns such that the item distribution condition is closer to a state in which each frequency of occurrence of each item is equal within the group of patterns; and
   deleting the at least one pattern that is selected.

* * * * *